S. G. MUNN.
Feed Water Heater.
No. 216,439. Patented June 10, 1879.
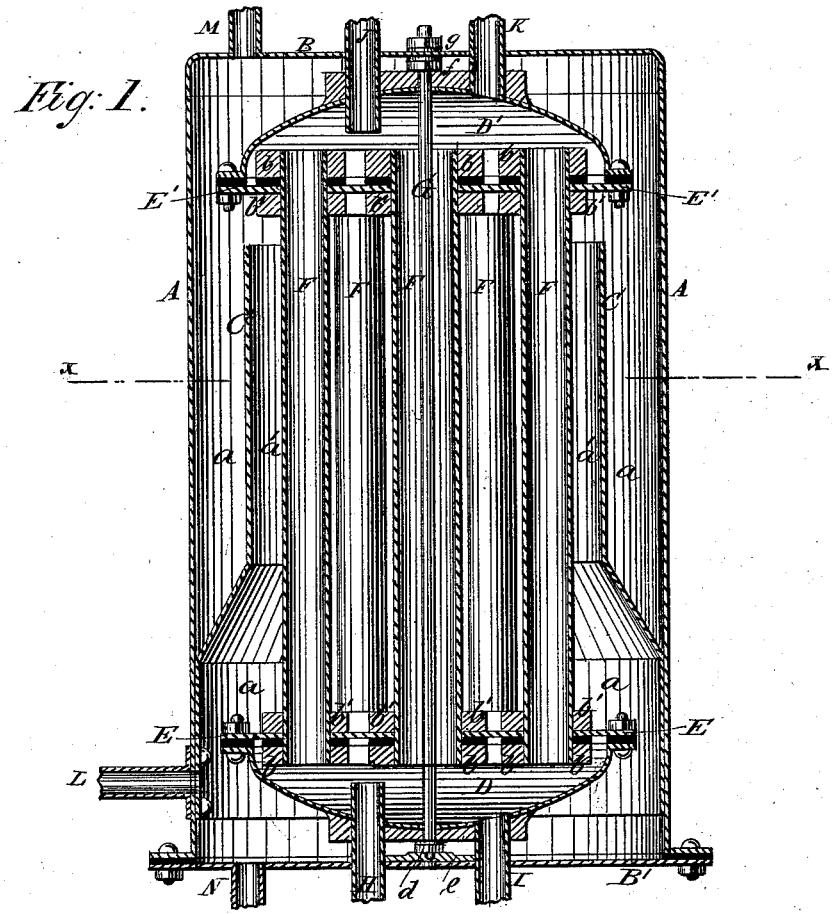
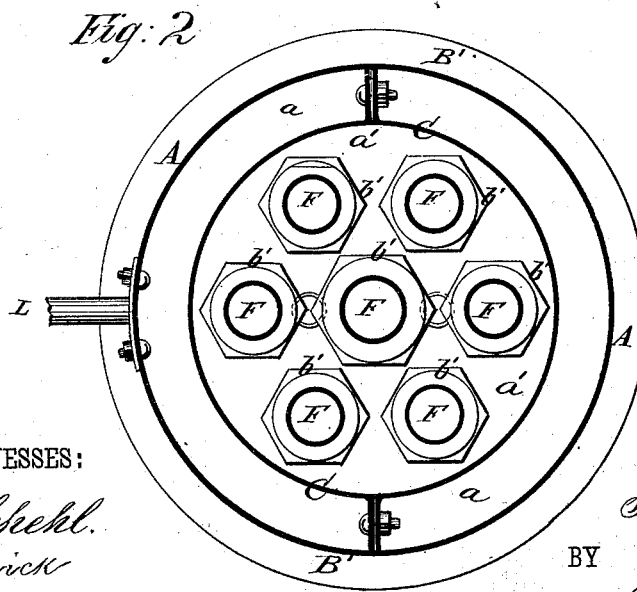
WITNESSES:
A. Schehl.
C. Sedgwick
INVENTOR:
S. G. Munn
BY Munn & Co
ATTORNEYS.

UNITED STATES PATENT OFFICE.

SAMUEL G. MUNN, OF CHICAGO, ILLINOIS.

IMPROVEMENT IN FEED-WATER HEATERS.

Specification forming part of Letters Patent No. 216,439, dated June 10, 1879; application filed April 4, 1879.

*To all whom it may concern:*

Be it known that I, SAMUEL G. MUNN, of Chicago, in the county of Cook and State of Illinois, have invented a new and Improved Feed-Water Heater, of which the following is a specification.

This invention relates to improvements in the construction and arrangement of feed-water heaters for steam-boilers; and the object of the said improvements is to heat the said water by the exhaust-steam from the engine to a temperature closely approximating to that of the exhaust-steam, and also to cleanse the water from impurities before entering the boiler.

It consists of two water-reservoirs connected by pipes running through a steam-chamber insulated from the exterior air by a double shell or jacket, pipes for supplying and exhausting the water from the reservoir, and pipes for blowing out the impurities, all arranged and co-operating to form an efficient water-heater, as will be described farther on.

In the accompanying drawings, Figure 1 is a vertical longitudinal section of my improvement, and Fig. 2 is a horizontal section on line $x\ x$ of Fig. 1.

Similar letters of reference indicate corresponding parts.

Referring to the drawings, A represents the cylindrical outside shell or case of the heater, provided with a head, B, and bottom B', both steam-tight. Within this shell is a second cylindrical shell, C, the lower part bolted to the walls of the outer shell, with which it is in contact, but contracted above the lower reservoir, so as to leave a space, $a$, between it and the outer shell. This shell terminates just below the upper reservoir.

D is the lower reservoir, and D' is the upper, dome-like in shape, and covered by heads E E', respectively bolted to them, and with water-tight joints. Heads E E' are connected by tubes F, opening into the reservoirs, and joined to the heads by the lock-nuts $b\ b'$, one on each side of the head, and screwed tightly against it, so as to connect the ends of the tubes and the heads together securely and permanently, and in such a way as to prevent any movement that would loosen the joint between the two, and thus permit the water to escape. Between the nuts $b$ on the inside of the reservoir and the surface of the head underneath packing is inserted to secure a perfectly water-tight joint.

The reservoir and connecting-tubes are held in place by a rod, G, passed down through the top or head B, thence through the dome of the reservoir, the central water-tube, to the lower reservoir through its dome, where its end is screwed through a nut, $d$, into a socket in the boss $e$ on the bottom B'. The dome of the lower reservoir rests upon the nut $d$, while at the top a nut, $f$, screws down on the dome on the inside, and a second nut, $g$, is secured over the projecting end and down on the top, thus connecting the reservoirs and tubes with the top and bottom of the outer shell, and preventing it from losing its position and relation to the same.

H is the water-supply pipe, to which the pump is attached, and which should be provided with a suitable check-valve. It opens some distance above the bottom of the reservoir, so as to give space below its mouth for the sediment to settle in the bottom, from whence it can be blown out through pipe I, leading through the bottom from the reservoir.

J is the water-pipe, leading from the upper reservoir to the boiler. It too extends some distance into the reservoir, so that its mouth opens below the surface of the water, so that the froth and scum rising to the surface will not enter it, and can be blown through pipe K. L is the exhaust-steam pipe leading through the two shells into the space $a'$. M is the escape-pipe for the steam, and N is the pipe for carrying off the condensed water.

The outer circle of tubes, it will be observed, is concentric to the central tube and shell C, and it is intended to arrange the tubes in concentric circles, so as to have no waste space to be filled with steam, but to utilize it to heat the several pipes.

The operation of the device is as follows: The cold water is pumped through pipe H into the lower reservoir, and rises slowly through pipes F to the upper reservoir, and, by the force of the pump, is expelled through pipe J, and thence into the boiler. The exhaust-steam is forced through pipe L into the space $a'$ and surrounds the pipes F, the jacket C compelling it to lie close to the pipes.

The water, from the time it enters the reservoir D, is subjected to the intense heat of this steam, and, while rising through the pipes F, is exposed to it on every side and in small bodies, so that by the time it is delivered into the boiler it is above the boiling-point.

The exhaust-steam is held by jacket C in contact with the pipes nearly their whole length, space only being left between its upper end and the head of the top reservoir to allow it to pass out, so that it can escape through pipe M. The water from the condensed steam passes off through pipe N.

Having thus described my invention, what I claim as new, and desire to secure by Letters Patent, is—

A feed-water heater for steam-boilers, having a double shell, a steam-chamber, pipes for supplying and carrying off water, and two reservoirs connected by pipes passing through said steam-chamber, all constructed and arranged substantially as shown and described.

SAMUEL G. MUNN.

Witnesses:
H. G. WORMER,
S. L. WILLIAMS.